United States Patent [19]

Smith

[11] 4,277,873
[45] Jul. 14, 1981

[54] CABLE MARKING DEVICE

[76] Inventor: Harlan B. Smith, 395 N.W. 10th, Canby, Oreg. 97013

[21] Appl. No.: 64,722

[22] Filed: Aug. 8, 1979

[51] Int. Cl.³ .............................................. B23P 19/02
[52] U.S. Cl. ...................................................... 29/235
[58] Field of Search .................. 29/235, 243.5, 243.52, 29/243.56, 270, 278, 281.5; 81/3 R, 3 E

[56] References Cited

U.S. PATENT DOCUMENTS

| | | | |
|---|---|---|---|
| 1,702,319 | 2/1929 | Sargent et al. | 81/3 R |
| 2,559,847 | 7/1951 | Brickman | 29/235 |
| 4,144,639 | 3/1979 | Miyakawa et al. | 29/235 X |

Primary Examiner—James G. Smith

Attorney, Agent, or Firm—Kolisch, Hartwell & Dickinson

[57] ABSTRACT

A marking device for providing a datum on a plurality of objects, such as spaced-apart cables having their longitudinal axes aligned generally parallel to one another, including a dispenser for releasably holding a plurality of attachments. The dispenser is shiftable relative to the cables for effecting contact between the cables and the attachments which results in simultaneous release and coupling of an attachment onto each of the cables. Preferably, the attachments are formed as resilient annular bands which are elastically deformable radially outwardly so that end portions thereof engage retaining members provided on the dispenser. Additionally, the dispenser includes spaced-apart slots which receive an associated cable.

6 Claims, 9 Drawing Figures

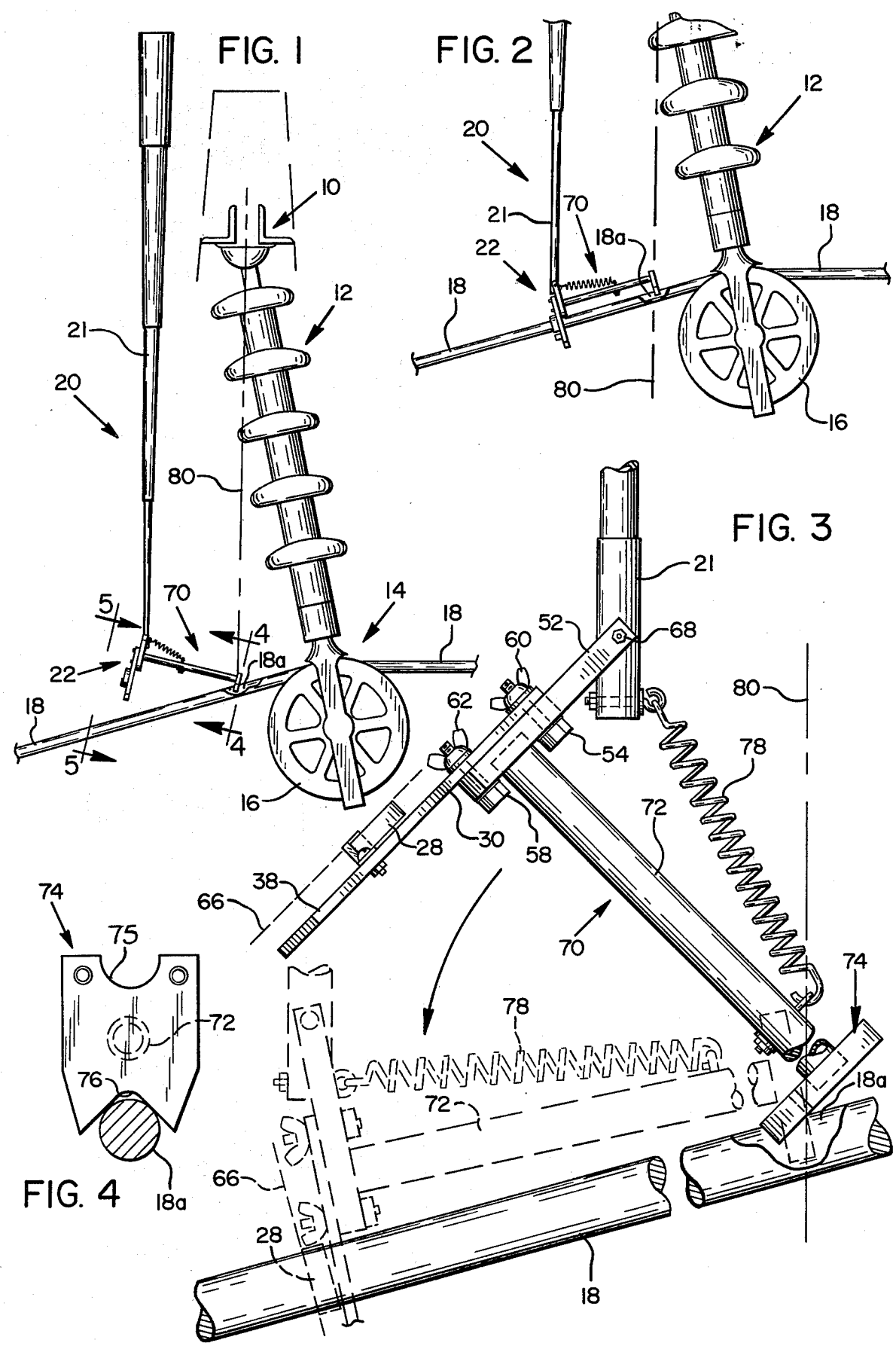

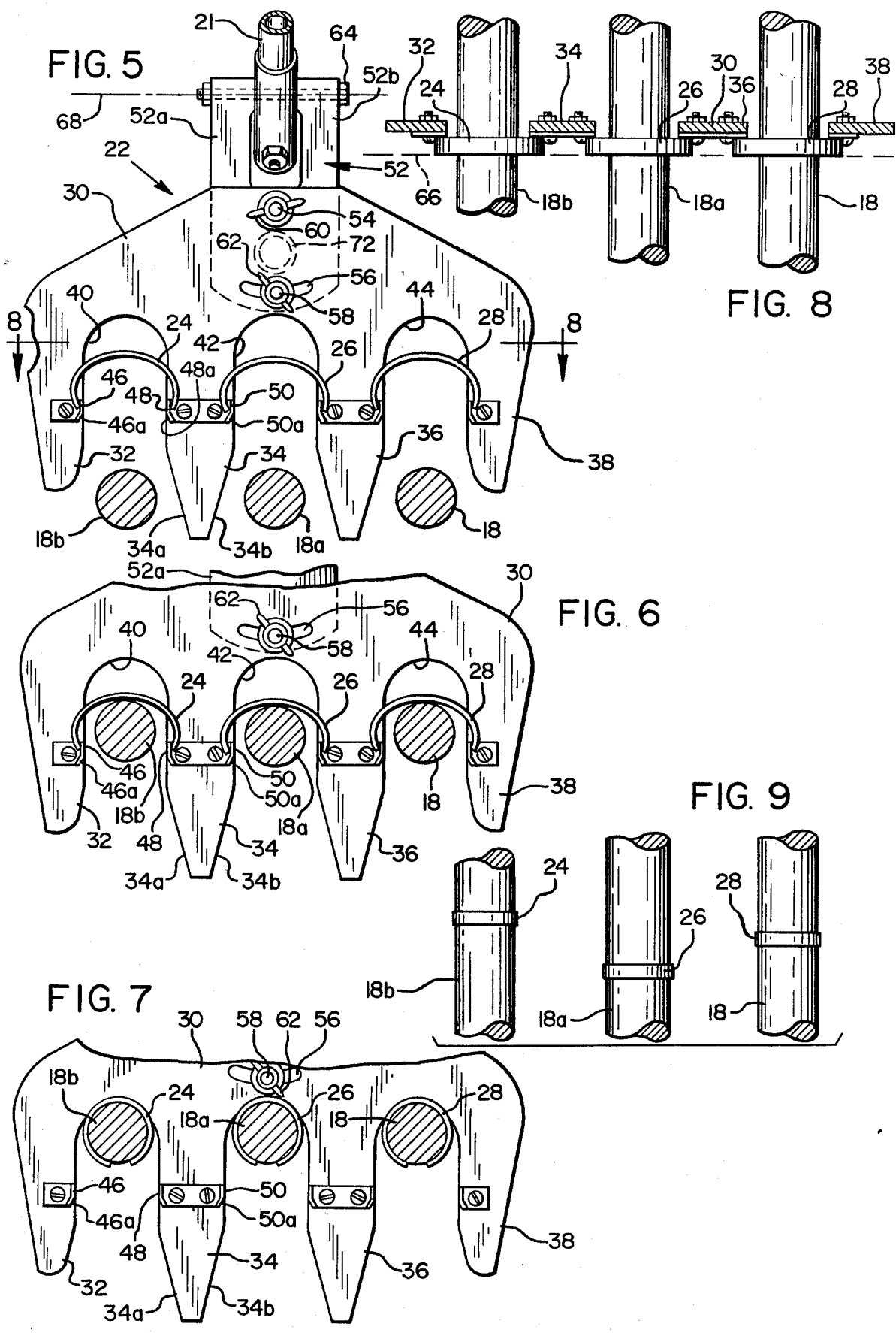

CABLE MARKING DEVICE

BACKGROUND AND SUMMARY OF THE INVENTION

The present invention relates to stringing of electrical conductor or cable on power transmission towers and more particularly to a novel device for fixing a datum on adjacent cables in order to determine if the cables have subsequently shifted along their longitudinal axes one relative to another.

The "stringing" of electrical conductor generally proceeds along the following pattern. Transmission towers having laterally extending cross-arms, for supporting electrical conductor, are erected at spaced-apart locations along a predetermined ground path. Suspended from the laterally extending cross-arms are insulators which are provided for supporting the electrical conductor. For purposes of illustration, it is assumed that three side-by-side positioned electrical conductors are to be strung between insulators on adjacent towers. Initially, travelers are mounted on the bottom of each insulator, the travelers including three grooved pulleys for accommodating or training the electrical conductors.

To facilitate stringing, the use of helicopters has been found to be particularly advantageous. For instance, one end of a cable or line from a spool may be connected to a helicopter. The craft then lifts off and transports the line, as it is payed out from the spool, for connection to the travelers on the transmission towers. Because electrical conductor is quite heavy, it may not be readily payed out from a spool by means of a helicopter. Rather, a so-called "sockline," which is wire rope of substantially less weight, is initially connected to the helicopter. The helicopter then flies alongside the predetermined path, pays out the sockline from the spool and places it in the center wheel of each of the travelers. After the sockline is placed in the last traveler, the line is released and attached to the end of another wire rope or ropes known as "hardlines." The sockline spool is mounted on a power-driven drum or winch and such is actuated to pull the sockline and hardlines back toward the first transmission tower.

When the hardlines reach the first tower, each hardline is connected to electrical conductor and the hardlines, joined with the electrical conductors, are then pulled back toward the end transmission tower. The result is the stringing of the electrical conductor which is now supported in the travelers. Dependent upon the spacing between adjacent transmission towers, the terrain, and local wind factors, it has been predetermined to what extent the electrical conductor between adjacent towers should "sag." Each electrical conductor must sag with a certain predetermined catenary curve, and suitable surveying techniques are used in conjunction with sagging or tightening the electrical conductor to set such catenary curves.

Next, it is necessary to mount permanent shoes at the bottom of each insulator so that the electrical conductor may be transferred from the moveable travelers for permanent mounting in the shoes. However, there may be a time lag between transfer of the electrical conductor from a traveler to a shoe. During this time lag, temperature changes, wind effects, and other factors may alter the catenary curve of each of the electrical conductors. Stated differently, the electrical conductors may shift along their longitudinal axes, one relative to another. Accordingly, it is common practice to "mark" each of the electrical conductors adjacent a traveler immediately after setting the catenary curves between adjacent transmission towers.

Typically, a workman is positioned above the insulator and utilizes a long pole having ink or other marking material provided on one end thereof to mark the electrical conductors. The workman marks each of the conductors along what is hoped to be a common line. Thus, if changes in the relative positions of the electrical conductor occur, such will be perceived when the electrical conductor is mounted in a shoe because the previously provided marks will not lie on the common line. Accordingly, the electrical conductors are then suitably shifted so that the marks appear to lie on the common line.

Considering the above-described marking procedure, which is exemplary of the prior art, it should be apparent that there are several significant disadvantages. First of all, a mark created by ink, crayon, etc. is subject to removal or obfuscation by the weather. In addition, the workman charged with the task of marking uses substantial guesswork in creating the marks along a common line. The workman can only hope that a series of say, three marks, one provided on each conductor, are scribed along a common line which is generally perpendicular to the longitudinal axes of the electrical conductors. Considering the outcome of this guesswork, it should be appreciated that if the marks are not accurately aligned along a common reference or datum and are offset, even as small an amount as $\frac{1}{2}''$, the result will be wide deviations in resetting the catenary curves from those curves originally set.

Still another problem with the prior art marking of electrical conductor resides in the fact that the marks may not be readily perceived. For instance, it may be necessary for an observer on the ground to view the marks. If marking is provided on top of the electrical conductor, it is virtually impossible for a ground observer to see same. This is especially true in view of the fact that transmission towers may reach substantial heights with the laterally extending cross-arms being located 75 feet above the ground or higher.

Accordingly, it is an object of the present invention to provide a novel marking device for providing a datum on a plurality of objects, such as spaced-apart conductors or cables having their longitudinal axes lying generally parallel to one another which includes a dispenser means for releasably holding a plurality of attachments. The dispenser means is shiftable, by means of a workman, relative to the cables, for effecting cable-attachment contact which results in substantially simultaneous release and coupling of an attachment onto each of the cables.

It is another object of the present invention to provide a dispenser means, as described above, which includes a novel mounting for supporting the attachments in an aligned manner along a common reference so that when the attachments are released, after contacting the cables, they will be substantially aligned on the common reference. This reference then provides a datum on the cables. This is necessary for accuracy when the cables are later readjusted so that the attachments are aligned.

Still another object of the present invention is to provide a novel type of attachment which is formed as a resilient annular band. Each band is elastically deformable radially outwardly so that it is initially loaded on the dispenser means in a "sprung" orientation. When a cable contacts an inside surface of the band, the band is released from the dispenser means, deforms radially inwardly, and contracts to grip the cable along a circumferential portion thereof. The band (which may be brightly colored) is thereby "clipped" onto a cable and is readily visually perceivable by a ground observer.

Yet another object of the present invention is to provide an orienting means connected to the dispenser means for positioning the attachments so that the common reference will be substantially perpendicular to the longitudinal axes of the cables. Thus, when the attachments or bands are "clipped" onto the cables, they will be clipped along the common reference which, in turn, will be perpendicular to the longitudinal axes of the cables. Accordingly, if a change in the relative positions of the cables occurs, the cables may be repositioned so that the bands are aligned along the common reference.

These and additional objects and advantages of the present invention will be more readily understood after a consideration of the drawings and the following detailed description of the preferred embodiment.

BRIEF DESCRIPTION OF THE DRAWINGS

FIG. 1 is a side elevation view showing initial positioning of the marking device of the present invention adjacent electrical conductor mounted on a traveler which is supported by an insulator suspended from the cross-arm of a power transmission tower;

FIG. 2 is a view similar to FIG. 1, illustrating shifting of the device for releasing attachments onto the cables;

FIG. 3 is an enlarged view similar to that shown in FIGS. 1 and 2, illustrating in further detail operational use of the marking device of the present invention;

FIG. 4 is a view taken along lines 4—4 of FIG. 1;

FIG. 5 is a view taken along lines 5—5 of FIG. 1 and illustrates the device of the present invention in a pre-spot position;

FIG. 6 is a view, similar to FIG. 5, illustrating positioning of the device for cable-attachment contact;

FIG. 7 is view, similar to FIGS. 5 and 6, and illustrates release of the attachments onto associated cables;

FIG. 8 is a cross-sectional view, taken along lines 8—8 of FIG. 5, and illustrates mounting of the attachments on a dispenser means in an aligned manner along a common reference; and FIG. 9 is a view illustrating subsequent shifting of the cables along their longitudinal axes, relative to one another, and the corresponding positioning of the attachments which have been previously coupled to the cables.

DETAILED DESCRIPTION OF THE PREFERRED EMBODIMENT

As mentioned previously, the present invention is directed to a marking device for marking cables which are suspended from the cross-arm of a power transmission tower. With attention now directed to FIG. 1, there is schematically shown an end view of a portion of a cross-arm generally indicated at 10. The cross-arm is suitably mounted to a power transmission tower (not shown) and an insulator, indicated at 12, is suspended from beneath cross-arm 10. Mounted to an end of insulator 12 is a traveler, generally indicated at 14, which includes three, concentrically mounted pulleys, one of which is shown at 16. Trained over a portion of the pulleys are three electrical conductors, hereinafter referred to as cables, one of which is shown at 18 in FIG. 1. It is to be appreciated that cable 18 extends to the right along a catenary curve for mounting to an insulator on an adjacent power transmission tower. Similarly, cable 18 extends to the left, along another preselected catenary curve for connection to another power transmission tower.

Generally indicated at 20, in FIGS. 1 and 2, is a marking device in accordance with the present invention which is operable for providing a datum on the cables. More specifically, device 20 includes a pole means 21 and a dispenser means, generally indicated at 22, for releasably holding a plurality of attachments. FIG. 1 illustrates positioning of device 20 in a pre-spot position prior to release of the attachments and FIG. 2 illustrates subsequent shifting of the pole means for positioning of the attachments on the cables. The actual procedure will be developed more fully as this description proceeds.

Turning now to FIG. 5, there is shown an enlarged view, taken along lines 5—5 of FIG. 1 of dispenser means 22. Reference is also directed to FIG. 3. The dispenser means is positioned above three cables such as indicated at 18, 18a and 18b. More specifically, the dispenser means is provided for releasably holding a plurality of attachments such as indicated at 24, 26, and 28. Upon suitable shifting of the dispenser means relative to the cables, there will eventually be effected cable-attachment contact which results in simultaneous release of an attachment for coupling onto each of the cables. In order to provide such a result, dispenser means 22 is formed as a fork-like plate member 30 which includes a plurality of elongate projections 32, 34, 36 and 38 spaced-apart to define cable-receiving slots such as indicated at 40, 42, and 44. Each elongate projection may be provided with a suitable taper, such as shown by sides 34a, 34b of elongate projection 34 for facilitating guiding of the dispenser means with the slots above an associated cable. Thus, the elongate projections function as a guide means for positioning between the cables to pre-spot an attachment adjacent a cable prior to contact between the cables and an attachment.

As also shown in FIG. 5, the dispenser means includes a mounting means for supporting attachments 24, 26 and 28 along a common reference, such as a reference line or plane. In order to provide such mounting, retaining members such as tabs indicated at 46, 48, 50, etc. are mounted on the elongate projections. Each of the retaining members includes a flared portion such as indicated at 46a, 48a, 50a, etc. which serve to hold the attachments in place. Explaining further, it is to be noted that each attachment is formed as a resilient annular band which is elastically deformable radially outwardly so that end portions thereof may engage the retaining members. As shown in FIG. 5, attachment 24 has been deformed radially outwardly so that it is mounted on retaining members 46, 48 for spanning across slot 40. Flared portions 46a, 48a prevent the ends of attachment 24 from slipping downwardly. Similarly, attachments 26 and 28 are mounted on retaining members provided on associated elongate projections for locating same to span across slots 42, 44, respectively.

Turning now to a consideration of both FIGS. 3 and 5, additional features of the marking device will now be described. As shown, a pivot plate 52 is connected to plate member 30 by means of a suitable connector such as bolt 54 (provided with a wing nut) which extends through accommodating aligned bores in plate member 30 and the pivot plate. Additionally, it is to be noted that plate member 30 is provided with an annular track or slot 56 which receives another connector 58. By extending connector 58 through a suitable bore in pivot plate 52, and outwardly through slot 56, plate member 30 may be pivoted about an axis extending through the bore accommodating connector 54 to selectively vary the angular positions of plate member 30 relative to pivot plate 52. Suitable wing nuts such as indicated at 60, 62 may be provided for facilitating the angular change. The purpose for providing an angular change will be described later.

It is to be noted that pole means 21 has an end portion thereof pivotally connected to pivot plate 52. Pivot plate 52 may conveniently be formed as a yoke having arms 52a, 52b provided with aligned bores which align with a bore in the end of the pole means for receiving a connector such as indicated at 64. Thus, it can be seen that pole means 21 is pivotal about an axis lying generally parallel to the reference line or reference plane defined by the attachments. More specifically, as can be seen from FIG. 3, the attachments when mounted on plate member 30 lie along a common reference plane or line such as indicated at 66. It can be readily appreciated that pole means 21 is pivotal about an axis 68 which lies generally parallel to reference 66.

With respect to positioning dispenser means 22 in a precise manner, an orienting means, generally indicated at 70, is provided. The orienting means includes an elongate member, such as tube 72, which extends from pivot plate 52, generally at right angles thereto, and is provided at the other end thereof with a stabilizing means generally indicated at 74. Also, as shown in FIG. 4, the stabilizing means is formed as a plate having a notch 76 for mounting on a cable. Another notch 75 enables stowing of pole means 21.

As can be seen, tube 72 extends from pivot plate 52 above slot 42 and serves to locate stabilizing means 74 on a central cable, assuming a three-cable configuration, as shown in FIG. 3. For instance, stabilizing means 74 is shown contacting cable 18a. The purpose of orienting means 70, which includes tube 72 and stabilizing means 74, is two-fold, namely: (1) for positioning the attachments so that the common reference is substantially perpendicular to the longitudinal axes of the cables, and (2) for spacing the attachments some preselected distance away from some predetermined location on the cables.

Further, pole means 21 is interconnected to tube 72 by a biasing means such as compression spring 78. The purpose of compression spring 78 is to provide an oblique angle between the longitudinal axis of pole means 21 and the longitudinal axis of tube 72. By providing such relative angular positioning between pole means 21 and tube 72, stabilizing means 74 may be initially positioned on a middle cable in a pre-spot position prior to release of the attachments onto the cables.

Use of the Marking Device

It will now be assumed that "sagging" has occurred, i.e. electrical conductor or cable in bundles of three has been strung between adjacent transmission towers and are received in travelers with predetermined catenary curves being set. It is now necessary to mark the cables with a datum, so that any subsequent shifting of the cables along their longitudinal axes, one relative to another, may be determined.

Accordingly, a workman utilizes marking device 20 of the present invention in the following manner. Initially, dispenser means 22 is loaded with attachments. This is a simple matter requiring only that the workman manually elastically deform radially outwardly three attachments, each of which is preferably made of bright-colored plastic, so that the attachments may be mounted to span across an associated slot. Each of slots 40, 42, and 44 are thus spanned by attachments as shown in FIG. 5. Next, the workman, who has been previously situated on top of a cross-arm, such as cross-arm 10, grips pole means 21 and lowers it until stabilizing means 74, with its notch 76, contacts the middle cable such as cable 18a. Initial contact is shown in FIG. 3 and it can be clearly seen that plate member 30 is disposed away from the cables. Stabilizing means 74 is positioned at some preselected location on the cables, such as adjacent the center-line of a power transmission tower. Any location could be selected, but as shown in FIGS. 1 and 3, stabilizing means 74 has been targeted on a reference indicated at 80 which would roughly correspond to the vertical centerline of a power transmission tower.

Next, the workman urges pole means 21 downwardly and this pivots plate member 30 about axis 68 so that the plate member approaches the cables. Because of the guiding action of elongate projections 32, 34, 36, and 38, it is ensured that their corresponding slots, such as slots 40, 42, and 44 will be aligned directly over associated cables. This is generally the position shown in FIG. 5 and FIG. 6 illustrates further lowering of pole means 21 and corresponding lowering of plate member 30 until the attachments contact the cables. Further deployment of pole means 21 is effected until the attachments, in effect, are simultaneously released or "snapped off" from their mounting on the retaining members, such as retaining members 46, 48, etc. for coupling to the cables. Because the attachments are resilient, they engage circumferential portions of the cables and are "clipped" thereon. The final "clipped" result is shown in FIG. 7, as well as FIG. 3 in dot-dash.

As mentioned previously, the attachments are loaded on plate member 30 in an aligned manner along a common reference, such as a reference line or plane indicated at 66 in FIG. 3. Thus, when the attachments are simultaneously released onto the cables, they will grip the cables along the same common reference. In order to more clearly show this, attention is directed to FIG. 8 which shows the attachments prior to release onto the cables. When the attachments are so released, they will be aligned along common reference 66. This reference corresponds to a datum on the cables.

However, the cables may subsequently shift relative to one another along their longitudinal axes so that the attachments no longer are aligned along the common reference. This is the situation shown in FIG. 9, and it is apparent that if the cables are shifted so that the attachments once again assume an aligned manner along a common reference, such as reference 66, the predetermined correct catenary curves will be provided.

From the above description, it should be readily apparent that the present invention provides several distinctive advantages. First of all, the marking device is operable for releasing attachments onto cables. The advantage in releasing attachments over some type of ink or crayon mark resides in the fact that the attachment will not wear off or become visually unperceivable due to weather. Additionally, attachments such as shown at 24, 26 and 28, formed as resilient annular bands, may be readily removed after cables have been realigned.

A particular advantage of the present invention results from the configuration of dispenser means 22 which includes a plurality of fingers or elongate projections for guiding the attachments onto associated cables. Further, because each of the attachments are aligned along a common reference, they will be released onto the cables substantially aligned on the same reference line. The actual release, created by the cables contacting the attachments, results in the attachments being lifted from their mounting on dispenser means 22 so that they "spring back" so as to grip a circumferential portion of an associated cable.

Still another advantage of the present invention resides in the use of orienting means 70 as shown in FIG. 3. Because it is generally necessary to locate the attachments at some distance away from traveler 14, so that the traveler does not interfere with the attachments, orienting means 70 has been found particularly advantageous. For instance, orienting means 70 includes a member such as tube 72 which is preselected with a length corresponding to some desired offset from a preselected cable location. Additionally, orienting means 70 includes stabilizing means 74 which permits lowering of pole means 21, with dispenser means 22 being cocked relative thereto so that stabilizing means 74 may be initially positioned on the preselected location on the cable. After stabilizing means 74 is so positioned, pole means 21 may therefore be lowered with dispenser means 22 being pivoted about axis 68 as well as about a pivot provided by the mounting of the stabilizing means on cable 18a until the cables contact the attachments. The orienting means ensures that the attachments will be positioned so that the common reference (indicated at 66) will be substantially perpendicular to the longitudinal axes of the cables. This is because tube 72 is mounted so as to extend from pivot plate 52 and stabilizing means 74 at right angles to each. Another advantage of stabilizing means 74 is that it serves as a "target" for locating dispenser means 22 at some distance offset from the point where the stabilizing means contacts a middle cable.

Still another advantage of the present invention resides in the simultaneous release of the attachments. Previously, it has been necessary for a workman to individually mark cables and attempt to situate each of the marks along a common reference. Of course, if a workman is positioned on top of a cross-arm and the cables are 20 feet below him, which is often the case, the accurate use of a long pole provided with ink, crayon, etc. on the end becomes a tricky matter. In contrast, the marking device of the present invention results in a simultaneous and precise release of attachments so that the attachments will grip the cables along a common reference. Further, because the attachments may be formed as colored bands, they are readily perceivable from the ground.

Still another advantage of the present invention resides in the fact that dispenser means 22 may be pivoted relative to pivot plate 52. As shown in FIG. 5, connectors 54, 58, provided with suitable wing nuts, may be loosened so that holder means 22 may be pivoted about the longitudinal axis of connector 54 with connector 58 being located at some suitable position along slot 56. The wing nuts may then be tightened in order to locate dispenser means 22 at some predetermined angle relative to pivot plate 52. It may be necessary to provide such an angle because the cables may be aligned at an angle, relative to the horizontal, if they are traveling around a tower which is located at a corner in a predetermined path.

While the invention has been particularly shown and described with reference to the foregoing preferred embodiment, it will be understood by those skilled in the art that other changes in form or detail may be made therein without departing from the spirit or scope of the invention as defined in the appended claims.

It is claimed and desired to secure by Letters Patent:

1. A marking device for providing a datum on a plurality of objects, such as spaced-apart cables having their longitudinal axes lying generally parallel to one another, comprising:
    a plurality of attachments for coupling to the cables, each attachment being formed as a resilient annular band having opposed ends, each attachment being elastically deformable radially outwardly;
    dispenser means shiftable toward the cables for releasably holding said attachments including guide means defined by a plurality of elongate projections for positioning between the cables to pre-spot an attachment adjacent each of the cables prior to cable-attachment contact, each pair of said projections being spaced-apart to define a cable-receiving slot; and
    mounting means disposed adjacent said projections, said mounting means being defined by retaining members extending outwardly from said projections for supporting and locating said attachments when they are elastically deformed radially outwardly so that said attachments span across an associated slot, contact of the cables with said attachments resulting in shifting of said attachments from said retaining members so that said attachments are released and inwardly contract to grip circumferential portions of the cables.

2. The marking device of claim 1 further including orienting means connected to said dispenser means for positioning said attachments so that said common reference is disposed substantially perpendicularly to the longitudinal axes of the cables.

3. The marking device of claim 2 wherein said orienting means includes an elongate member rigidly mounted on said dispenser means substantially perpendicularly to said common reference.

4. The marking device of claim 3 wherein said orienting means further includes stabilizing means mounted on said elongate member for removable positioning on at least one of the cables.

5. The marking device of claim 4 further including pole means pivotally connected to said dispenser means and extending outwardly therefrom, said pole means being pivotal about an axis lying generally parallel to said common reference.

6. The marking device of claim 5 further including biasing means interconnecting said pole means and said orienting means for disposing said dispenser means away from the cables when said stabilizing means is initially positioned on a cable so that when a force is directed along the longitudinal axis of said pole means toward said dispenser means, said pole means pivots relative to said dispenser means.

* * * * *